United States Patent
Toya

(10) Patent No.: US 7,757,827 B2
(45) Date of Patent: Jul. 20, 2010

(54) LOCKUP CLUTCH

(75) Inventor: Ritsuo Toya, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 671 days.

(21) Appl. No.: 11/603,101

(22) Filed: Nov. 22, 2006

(65) Prior Publication Data

US 2007/0119675 A1    May 31, 2007

(30) Foreign Application Priority Data

Nov. 25, 2005    (JP)    ............... 2005-340491

(51) Int. Cl.
*F16H 45/02*    (2006.01)
(52) U.S. Cl. .................. 192/3.29; 192/107 R
(58) Field of Classification Search ............... 192/3.29, 192/3.28, 113.36, 107 R
See application file for complete search history.

(56) References Cited

U.S. PATENT DOCUMENTS

| | | | | |
|---|---|---|---|---|
| 4,986,397 A | * | 1/1991 | Vierk | 192/3.3 |
| 5,056,631 A | * | 10/1991 | Macdonald | 192/3.29 |
| 5,605,210 A | * | 2/1997 | Koike et al. | 192/3.29 |
| 5,799,763 A | * | 9/1998 | Dehrmann | 192/3.29 |
| 5,921,366 A | * | 7/1999 | Walth et al. | 192/113.36 |
| 6,035,992 A | * | 3/2000 | Menard et al. | 192/107 M |
| 6,062,367 A | * | 5/2000 | Hirayanagi et al. | 192/107 R |
| 6,123,178 A | * | 9/2000 | Hinkel | 192/3.29 |
| 6,213,273 B1 | * | 4/2001 | Menard et al. | 192/107 M |
| 7,000,747 B2 | * | 2/2006 | Back et al. | 192/3.3 |
| 7,143,882 B2 | * | 12/2006 | Matthes et al. | 192/52.3 |
| 7,322,453 B2 | * | 1/2008 | Kinoshita et al. | 192/3.28 |
| 2006/0118378 A1 | * | 6/2006 | Fujii et al. | 192/3.28 |

FOREIGN PATENT DOCUMENTS

JP    2000-88079 A    3/2000
JP    2000088079 A *    3/2000

* cited by examiner

*Primary Examiner*—Rodney H Bonck
*Assistant Examiner*—Justin Holmes
(74) *Attorney, Agent, or Firm*—Crowell & Moring LLP

(57) ABSTRACT

A lockup clutch for a torque converter is provided with a friction lining. The friction lining is divided into a radially-outer-side friction lining and a radially-inner-side friction lining. μ-ν characteristics of the radially-outer-side friction lining have a positive gradient to inhibit occurrence of a shudder by a stick-slip which takes place. The radially-inner-side friction lining is equipped with a large coefficient of static friction to provide large torque capacity during a clutch engagement. The radially-outer-side friction lining is bonded on a side of a piston in said lockup clutch.

2 Claims, 5 Drawing Sheets

LOCKUP CLUTCH

FIELD OF THE INVENTION

This invention relates to improvements in a lockup clutch, which is useful in a torque converter of an automatic transmission and can inhibit a shudder which takes place by a stick-slip.

DESCRIPTION OF THE BACKGROUND

FIG. 1 is a cross-sectional view showing the fundamental construction of a torque converter equipped with a lockup clutch. A torque converter 10 comprises a pump section 2, a turbine section 3, and a stator 4. FIG. 1 also illustrates a front cover 21, an outer shell 22, blades 23 and an inner core 24 of the pump section 2, an outer shell 32, blades 33 and an inner core 34 of the turbine section 3, and a turbine hub 35.

Also shown in FIG. 1 are a clutch piston 5, a damper support portion 51, a damper 52, a damper plate 53 and a damper spring 54 of the lockup clutch. The outer shell 32 of the turbine section 3, the turbine hub 35 and the damper plate 53 are joined together by a rivet 55. Designated at numeral 56 is a hole located centrally in the piston 5, and through the hole 56, the turbine hub 35 extends. Numeral 7 indicates a friction lining bonded on a clutch-engaging portion of the clutch piston 5. It is to be noted that this friction lining may be bonded on the side of the front cover 21. Numeral 6 designates a coupling welded on the front cover 21 and adapted to connect the torque converter to an engine. An alternate long-and-short dash line X-X indicates a central axis of the whole torque converter.

In recent years, there is an increasing tendency toward actuating a lockup clutch even from a low vehicle-speed range to improve the fuel economy. Reflecting this tendency, slip control is increasingly performed these days. In such slip control, the lockup clutch involves a problem in that a clutch piston and a damper or the like act as a shuddering body and a resilient body, respectively, and vibrations called a shudder occur as a result of a stick-slip of a friction lining.

A friction lining is formed from fibers, a filler, a friction modifier, and a resin dissolved in a solvent. As the solvent evaporates, the resin located inside the green friction lining progressively moves together with the solvent close to the surface. A high resin-proportion layer with the resin contained at a high concentration is, therefore, formed near the surface of the friction lining. The friction lining has a high coefficient of friction when the slip rotation speed is low, but a low coefficient of friction when the slip rotation speed becomes high. In other words, the $\mu$-v characteristics of the friction lining have a negative gradient, thereby causing a shudder by a stick-slip when the clutch is brought into engagement. It is to be noted that the expression "slip rotation speed" as used here in means a difference in rotation speed between a member with a friction lining bonded thereon and another member having a counterpart friction surface.

It has, therefore, been a conventional practice to remove the high resin-proportion layer from the surface of the friction lining and further to subject the friction lining to cutting on the side of its outer circumference such that the surface is rendered smooth. This cutting is usually performed in automatic transmission fluid. The automatic transmission fluid, therefore, adheres to the product, leading to a deterioration in the working environment. Moreover, the need for the cutting results in higher manufacturing cost.

It was, therefore, contemplated to divide a friction lining into a radially-outer-side friction lining and a radially-inner-side friction lining, to make the proportion of a filler higher in the radially-outer-side friction lining than in the radially-inner-side friction lining to provide the $\mu$-v characteristics of the radially-outer-side friction lining with a positive gradient, in other words, such that the coefficient of friction becomes higher with the slip rotation speed to inhibit a shudder which takes place by a stick-slip; and further, to make higher the proportion of fibers in the radially-inner-side friction lining to provide the radially-inner-side friction lining with flexibility and to increase the sealing property and contact area of its friction surface and hence the coefficient of static friction, thereby making the lock-up capacity greater.

As a result of research, it became clear that among fillers, it is diatomaceous earth that is effective for the inhibition of a shudder. Recently, there is a tendency toward referring a combination of a filler and a friction modifier simply as "a filler".

It was also found that, even if the proportion of fibers is not made specifically higher in a radially-inner-side friction lining than in a radially-outer-side friction lining, the coefficient of static friction of the radially-inner-side friction lining can still be made higher than that of the radially-outer-side friction lining by adjusting the proportion of the filler including a friction modifier.

FIG. 2 is a front view of the friction lining 7 bonded on the piston 5 as viewed at a friction surface of the piston 5, while FIG. 3 is a cross-sectional view taken in the direction arrows III-III of FIG. 2. FIGS. 2 and 3 show a radially-outer-side friction lining 71, a radially-inner-side friction lining 72, and a seam 73 between the friction lining 71 and the friction lining 72.

In a lockup clutch, a radially-outer-side friction lining, the thickness of which is greater than a radially-inner-side friction lining and the $\mu$-v characteristics of which have a positive gradient, firstly comes into contact with an opposing surface to perform slip control so that the occurrence of a shudder is inhibited. As a consequence, the slip speed is high at the radially-outer-side friction lining, resulting in the production of large heat under friction. Problems have, therefore, arisen as to the dealing of the heat and the heat resistance of the radially-outer-side friction lining.

SUMMARY OF THE INVENTION

In one aspect of the present invention, there is thus provided a lockup clutch for a torque converter, wherein a friction lining is divided into a radially-outer-side friction lining and a radially-inner-side friction lining, $\mu$-v characteristics of the radially-outer-side friction lining have a positive gradient to inhibit occurrence of a shudder which takes place by a stick-slip, the radially-inner-side friction lining is equipped with a large coefficient of static friction to provide large torque capacity during a clutch engagement, and the radially-outer-side friction lining is bonded on a side of a piston in the lockup clutch.

In the present invention, the radially-outer-side friction lining, which comes into contact with an opposing surface from an initial stage of a clutch engagement to perform slip control and produces a substantial quantity of heat, is bonded on the side of the piston in the lockup clutch. The produced heat is, therefore, released to the side of the front cover, which has a large thickness, great heat capacity, and high heat-releasing effects. Accordingly, the present invention can compensate for the disadvantage of the radially-outer-side friction lining that its heat resistance is low although a shudder is hardly produced as its advantage, so that the present invention can minimize problems which may arise from the produced heat.

Preferably, the radially-inner-side friction lining which is required to provide large torque capacity during a clutch engagement may be bonded on the side of a front cover in the lockup clutch. As a result, heat loads on the respective friction linings can be reduced, thereby making it possible to provide a lockup clutch of still lighter weight.

DETAILED DESCRIPTION OF THE INVENTION AND PREFERRED EMBODIMENTS

When a radially-inner-side friction lining having a large coefficient of static friction is boded on the side of a front cover, the heat produced at the radially-inner-side friction lining during a clutch engagement is allowed to flow to the side of the opposing piston. As a consequence, the heat is distributively conducted away, thereby further improving the heat resistance of the friction lining.

During a clutch engagement, a central part of the piston is flexed under a hydraulic pressure toward the front cover. To assure that the friction lining be kept in close contact at its entire surface with the opposite surface during that time, it is preferred to form the radially-outer-side friction lining thicker than the radially-inner-side friction lining. In an initial stage of a clutch engagement, the friction lining therefore begins to contact at the radially-outer-side friction lining. As described above, the radially-outer-side friction lining is constructed such that the occurrence of a shudder can be inhibited.

Further, a seal member may be arranged between the radially-outer-side friction lining and the radially-inner-side friction lining. The seal member can prevent oil from flowing around from a piston-pressing side to a side of a piston release or disengagement chamber, thereby making it possible to effectively perform the pressing of the piston. In addition, the oil is allowed to flow onto the friction surface of the radially-outer-side friction lining in an initial stage of a clutch engagement so that the friction surface is adequately lubricated to effectively perform the slip control. During the clutch engagement, on the other hand, the oil does not flow to the radially-inner-side friction lining so that the torque capacity increases further.

Figure 1:
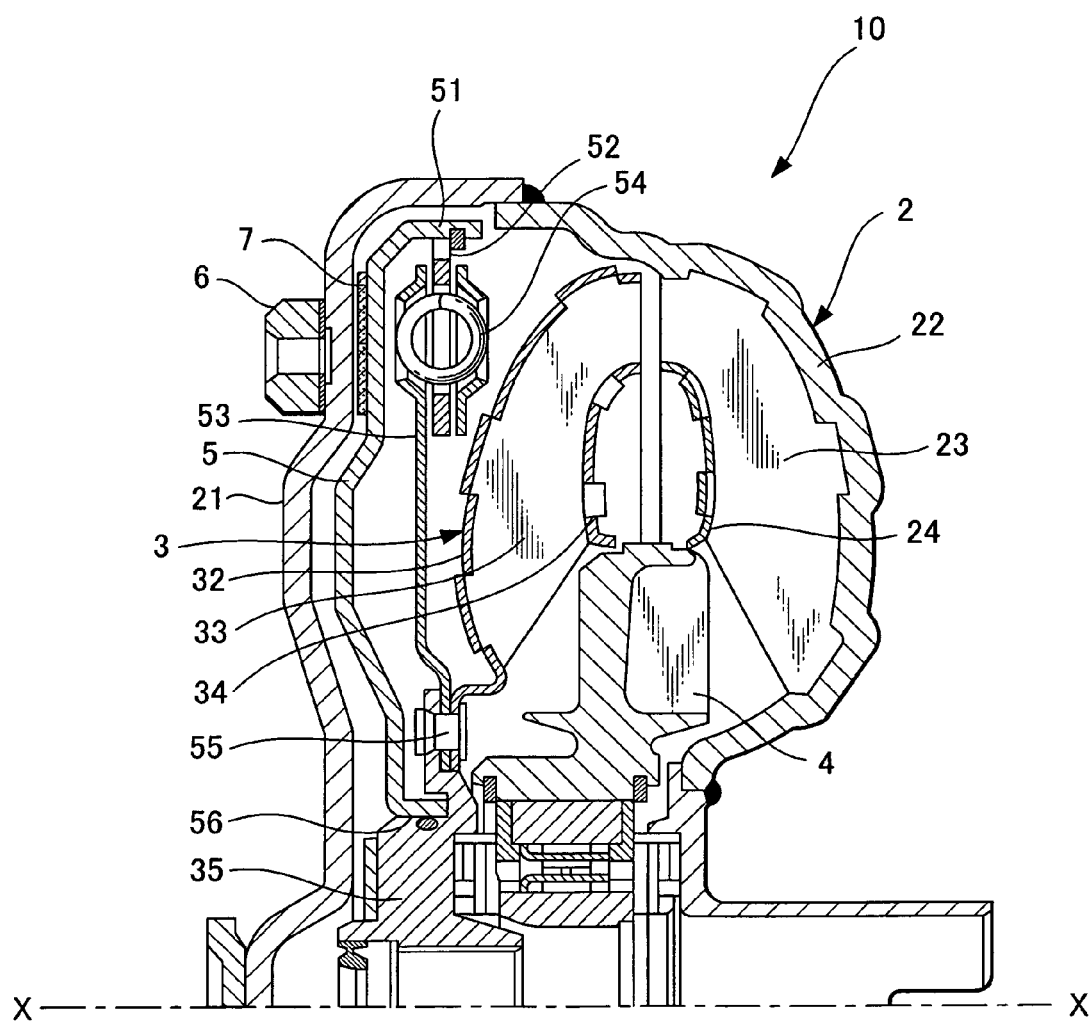
FIG. 1 is a cross-sectional view showing the fundamental construction of a torque converter equipped with a lockup clutch.
Figure 2:
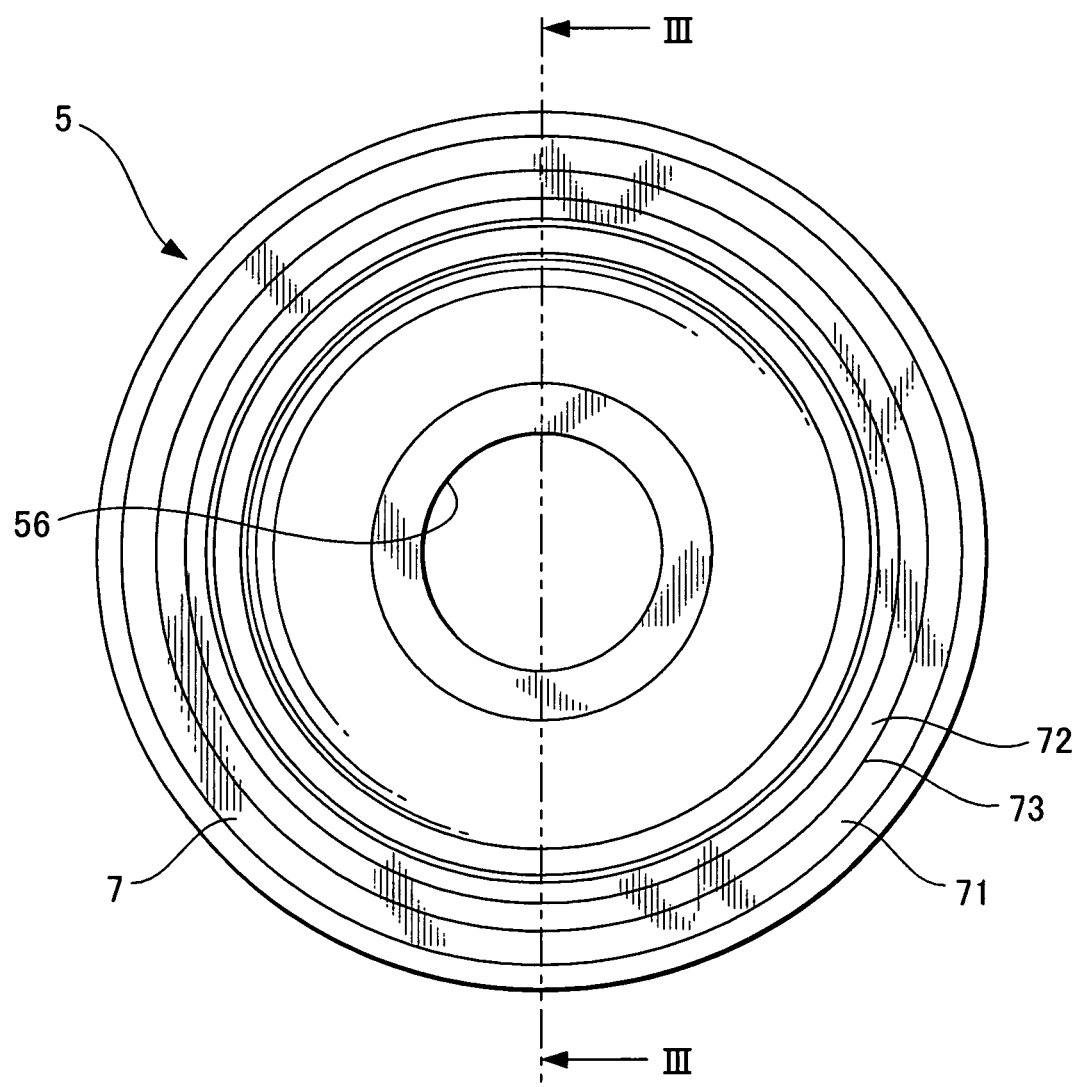
FIG. 2 is a front view of a piston in the lockup clutch as viewed at a friction surface of the piston.
Figure 3:
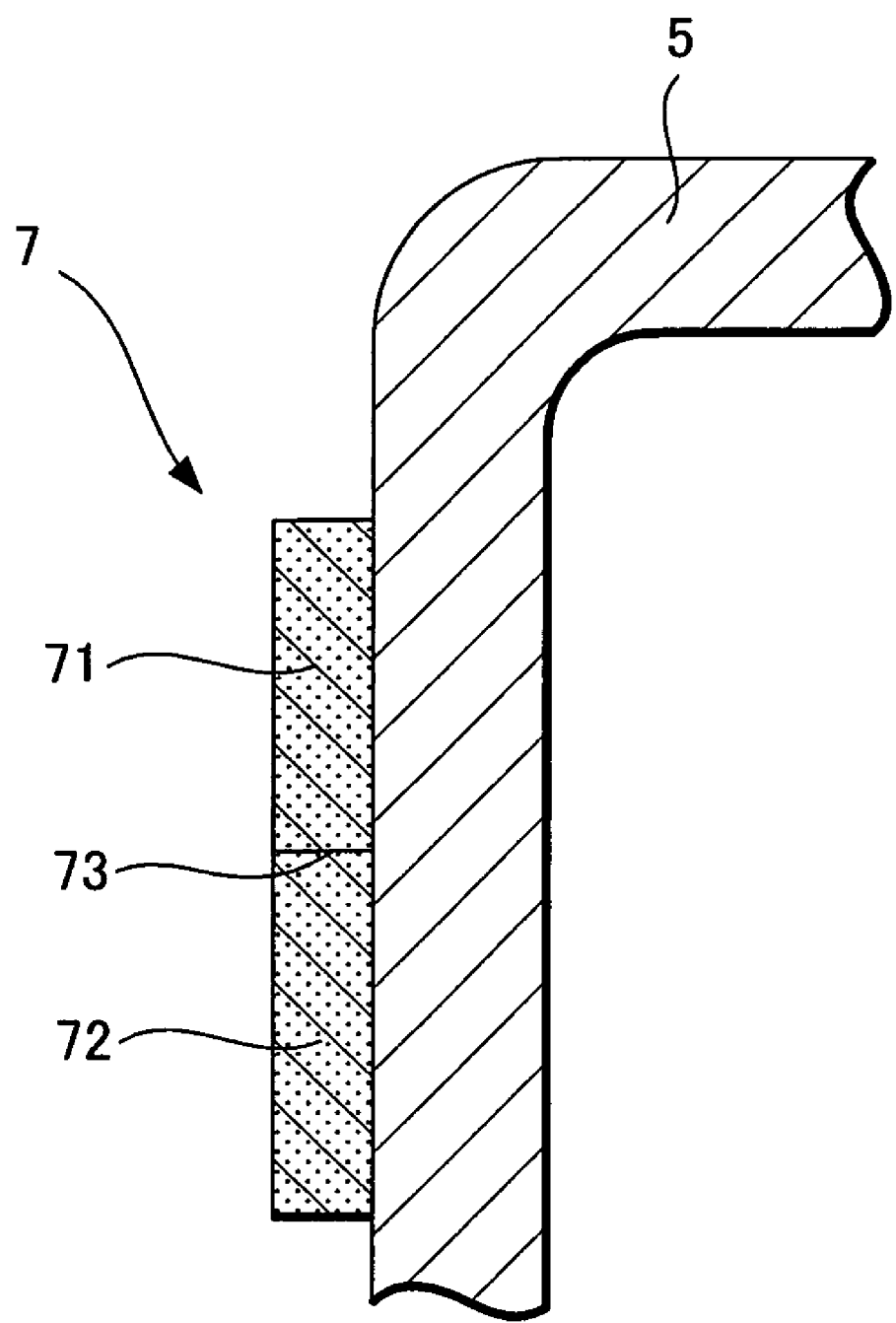
FIG. 3 is cross-sectional view of the piston, taken in the direction of arrows III-III of FIG. 2.
Figure 4:
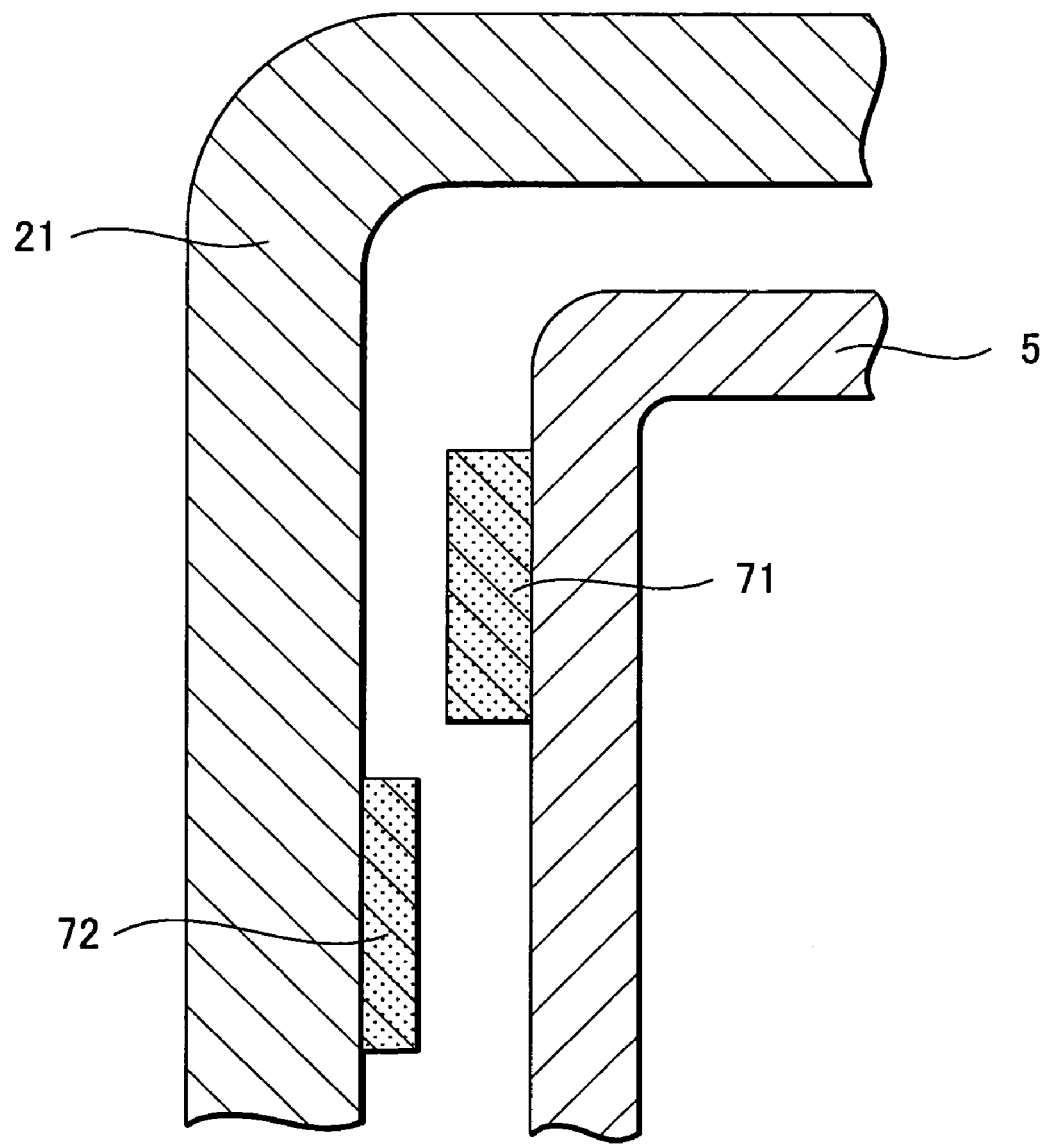
FIG. 4 is a view similar to FIG. 3, but illustrates a first embodiment of the present invention.
Figure 5:
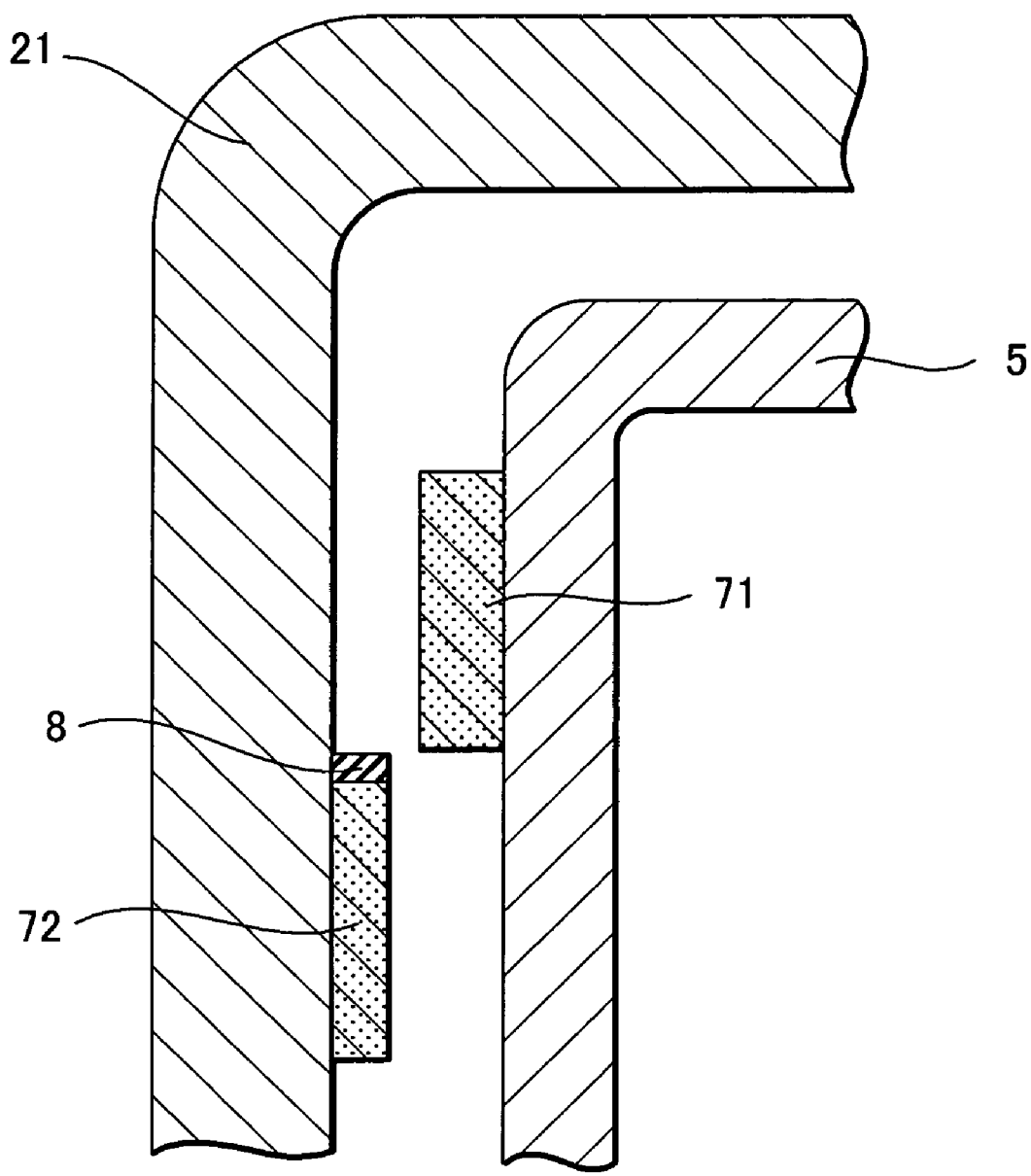
FIG. 5 is a view similar to FIG. 4, but illustrates a second embodiment of the present invention.

FIGS. 4 and 5 are cross-sectional views similar to FIG. 2, but illustrate the first and second embodiments of the present invention, respectively. In FIGS. 4 and 5, those elements of the lockup clutches which are the same as or equivalent to their corresponding elements in FIG. 2 are shown by the same reference numerals.

In the first embodiment shown in FIG. 4, a radially-outer-side friction lining 71 is bonded on a piston 5 while a radially-inner-side friction lining 72 is bonded on a front cover 21. As seen from the drawing, the radially-outer-side friction lining 71 is formed thicker than the radially-inner-side friction lining 72.

Owing to the use of a filler containing diatomaceous earth in a greater proportion, the radially-outer-side friction lining 71 is provided with μ-v characteristics of positive gradient to inhibit the occurrence of a shudder which takes place by a stick-slip.

The coefficient of static friction of the radially-inner-side friction lining can also be made greater by adjusting the proportion of the filler, including a friction modifier, other than making higher the proportion of fibers in the radially-inner-side friction lining.

As the radially-outer-side friction lining 71 is bonded on the piston 5 in the present invention as shown in the drawing, the radially-outer-side friction lining 71 is progressively brought into contact with the front cover 21 as a clutch engagement begins to take place. The radially-outer-side friction lining 71 is sliding under friction at a high slip speed so that a substantial quantity of heat is produced. The thus-produced heat is, however, released to the front cover 21 having a large thickness, great heat capacity and high heat-releasing effects. It is, therefore, possible to minimize the problems, which would otherwise arise as a result of the production of the substantial heat, and to compensate for the low heat resistance of the friction lining which hardly produces a shudder.

On the other hand, the radially-inner-side friction lining 72 is bonded on the front cover 21, so that heat produced at the radially-inner-side friction lining 72 as mentioned above is conducted away to the side of the piston 5. As a consequence, the heat is distributively conducted away, thereby providing the friction linings with still further improved heat resistance.

Further, frictional heat produced at the radially-inner-side friction lining 72 of large torque capacity during a clutch engagement is conducted away to the side of the piston 5. Compared with a heat load on a radially-outer-side friction lining in a conventional lockup clutch, a heat load on the radially-outer-side friction lining 71 which is under the slip control is reduced.

As understood from the foregoing, the roles of a friction surface, which are required in an initial stage of a clutch engagement and during the clutch engagement, respectively, are assigned separately to the respective friction linings in the present invention. Therefore, the performances of the friction surfaces, which are required at the time of a slip in the initial stage of the clutch engagement and during the clutch engagement, respectively, can be both exhibited efficiently.

With reference to FIG. 5, the second embodiment of the present invention will next be described. A seal member 8 is arranged between a radially-outer-side friction lining 71 and a radially-inner-side friction liming 72. Although the seal member 8 is arranged on a front cover 21 in the drawing, it may alternatively be arranged on a piston 5.

Owing to the arrangement of the seal member 8, oil is prevented from flowing around from a piston-pressing side to a side of a piston release or disengagement chamber, thereby increasing piston-pressing force. Further, oil flows onto a surface of the radially-outer-side friction liming 71 to lubricate the surface, and therefore, is effective for slip control. The oil, however, does not flow around onto a surface of the radially-inner-side friction liming 72. Accordingly, a lockup with still larger torque capacity is feasible. It is to be noted that any friction material or rubber-based material can be used for the seal element 8 insofar as it is equipped with elasticity, heat resistance and oil resistance.

This application claims the priority of Japanese Patent Application 2005-340491 filed Nov. 25, 2005, which is incorporated herein by reference.

The invention claimed is:

1. A lockup clutch for a torque converter, comprising:
a front cover,
a piston, and
a friction lining that is divided into a radially-outer-side friction lining and a radially-inner-side friction lining,
wherein μ-v characteristics of said radially-outer-side friction lining have a positive gradient to inhibit occurrence of a shudder which takes place by a stick-slip,
wherein said radially-inner-side friction lining is equipped with a large coefficient of static friction to provide large torque capacity during a clutch engagement,
wherein said radially-outer-side friction lining is bonded on a side of said piston in said lockup clutch,
wherein said radially-inner-side friction lining is bonded on a side of said front cover in said lockup clutch, and
wherein said radially-outer-side friction lining is thicker than said radially-inner-side friction lining.

2. A lockup clutch for a torque converter, comprising:
a front cover,
a piston,
a friction lining that is divided into a radially-outer-side friction lining and a radially-inner-side friction lining, and
a seal member arranged between said radially-outer-side friction lining and said radially-inner-side friction lining on a side of one of said piston and said front cover in said lockup clutch,
wherein μ-v characteristics of said radially-outer-side friction lining have a positive gradient to inhibit occurrence of a shudder which takes place by a stick-slip,
wherein said radially-inner-side friction lining is equipped with a large coefficient of static friction to provide large torque capacity during a clutch engagement,
wherein said radially-outer-side friction lining is bonded on a side of said piston in said lockup clutch, and
wherein said radially-inner-side friction lining is bonded on a side of said front cover in said lockup clutch.

* * * * *